(12) United States Patent
Gong

(10) Patent No.: US 9,595,119 B2
(45) Date of Patent: Mar. 14, 2017

(54) DISPLAY PANEL AND DISPLAY DEVICE HAVING THE SAME

(71) Applicant: SAMSUNG DISPLAY CO., LTD., Yongin, Gyeonggi-Do (KR)

(72) Inventor: Su-Cheol Gong, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 119 days.

(21) Appl. No.: 14/285,850

(22) Filed: May 23, 2014

(65) Prior Publication Data

US 2015/0070374 A1 Mar. 12, 2015

(30) Foreign Application Priority Data

Sep. 12, 2013 (KR) ........................ 10-2013-0109541

(51) Int. Cl.
| | | |
|---|---|---|
| G09G 5/02 | (2006.01) | |
| G09G 3/14 | (2006.01) | |
| G09G 3/20 | (2006.01) | |
| G09G 5/00 | (2006.01) | |
| G06T 5/40 | (2006.01) | |
| H04N 5/66 | (2006.01) | |
| G06T 11/00 | (2006.01) | |
| G02F 1/1343 | (2006.01) | |

(52) U.S. Cl.
CPC ...... *G06T 11/001* (2013.01); *G02F 1/134309* (2013.01); *G02F 2001/134345* (2013.01); *G02F 2201/52* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,663,299 B2* | 2/2010 | Chao et al. | ......... | H01L 27/3216 313/500 |
| 8,098,784 B2* | 1/2012 | Campbell | ................ | G06F 1/04 375/355 |
| 8,569,947 B2* | 10/2013 | Jeon et al. | .......... | H01L 27/3211 313/500 |
| 9,098,136 B2* | 8/2015 | Kim | .................... | H01L 27/3218 |
| 2002/0070909 A1* | 6/2002 | Asano et al. | ........ | G09G 3/3233 345/76 |
| 2005/0041188 A1 | 2/2005 | Yamazaki | | |
| 2006/0061526 A1* | 3/2006 | Shirasaki et al. | .... | G09G 3/3233 345/77 |
| 2006/0076550 A1 | 4/2006 | Kwak et al. | | |

(Continued)

FOREIGN PATENT DOCUMENTS

| | | |
|---|---|---|
| KR | 10-2004-0096706 A | 11/2004 |
| KR | 10-2005-0019052 A | 2/2005 |

(Continued)

*Primary Examiner* — Wesner Sajous
(74) *Attorney, Agent, or Firm* — Lee & Morse, P.C.

(57) ABSTRACT

A display panel with a plurality of unit pixels, each of the plurality of unit pixels including a first sub-pixel having a polygonal shape having five or more sides, a second sub-pixel having a rectangular shape, and a third sub-pixel having a polygonal shape having five or more sides, the first, second, and third sub-pixels being configured to emit light having different colors from each other, and the first sub-pixel and the third sub-pixel being symmetrically arranged with respect to the second sub-pixel.

16 Claims, 8 Drawing Sheets

(56) References Cited

U.S. PATENT DOCUMENTS

| | | | |
|---|---|---|---|
| 2007/0035485 A1* | 2/2007 | Yoon | G09G 3/3208 345/76 |
| 2010/0265160 A1* | 10/2010 | Hajjar | G03B 21/567 345/1.3 |
| 2011/0012820 A1 | 1/2011 | Kim et al. | |
| 2012/0056531 A1* | 3/2012 | Park et al. | H01L 27/3211 313/506 |
| 2013/0016313 A1* | 1/2013 | Shim et al. | G02F 1/133514 349/106 |
| 2013/0027437 A1* | 1/2013 | Gu | G09G 3/3607 345/690 |
| 2013/0271707 A1* | 10/2013 | Sakamoto et al. | G02F 1/139 349/106 |
| 2013/0300989 A1* | 11/2013 | Hibayashi et al. | G02F 1/133512 349/108 |
| 2014/0042887 A1* | 2/2014 | Ko | H01L 27/3216 313/1 |
| 2014/0077186 A1* | 3/2014 | Kim | H01L 27/3218 257/40 |
| 2014/0267955 A1* | 9/2014 | Hibayashi et al. | G06F 3/0412 349/12 |
| 2015/0077640 A1* | 3/2015 | Kanda | G09G 3/3607 348/713 |

FOREIGN PATENT DOCUMENTS

| | | |
|---|---|---|
| KR | 10-2006-0000354 A | 1/2006 |
| KR | 10-2006-0032704 A | 4/2006 |
| KR | 10-2011-0006343 A | 1/2011 |

\* cited by examiner

DISPLAY PANEL AND DISPLAY DEVICE HAVING THE SAME

CROSS-REFERENCE TO RELATED APPLICATION

Korean Patent Application No. 10-2013-0109541, filed on Sep. 12, 2013, in the Korean Intellectual Property Office, and entitled: "Display Panel and Display Device Having The Same," is incorporated by reference herein in its entirety.

BACKGROUND

1. Field

Example embodiments relate generally to a display device. More particularly, embodiments relate to a display device having a high resolution.

2. Description of the Related Art

Generally, a display panel may include a plurality of unit pixels. Each of the unit pixels may include a red (R) sub-pixel, a green (G) sub-pixel, and a blue (B) sub-pixel.

In a conventional display device, each sub-pixel has a rectangular shape or a square shape, and red, green, and blue sub-pixels are sequentially disposed in each of the unit pixels. Thus, each of the unit pixels also has a rectangular shape or a square shape, thereby limiting the resolution of the display device.

SUMMARY

Example embodiments provide a display panel having a high resolution.

Example embodiments provide a display device including a display panel having a high resolution.

According to some example embodiments, a display panel includes a plurality of unit pixels. Each of unit pixels includes a first sub-pixel having a polygonal shape having five or more sides, a second sub-pixel having a rectangular shape, and a third sub-pixel having a polygonal shape having five or more sides, the first, second, and third sub-pixels being configured to emit light having different colors from each other, and the first sub-pixel and the third sub-pixel being symmetrically arranged with respect to the second sub-pixel.

In example embodiments, each of the first sub-pixel and the third sub-pixel may have a pentagonal shape, and each of the plurality of unit pixels may have a hexagonal shape.

In example embodiments, each of the first sub-pixel and the third sub-pixel may have a hexagonal shape, and each of the plurality of unit pixels may have an octagonal shape.

In example embodiments, the first sub-pixel, the second sub-pixel, and the third sub-pixel may be sequentially located in a column direction.

In example embodiments, the first sub-pixel included in a first unit pixel of the plurality of unit pixels may emit light having a color different from a color of light emitted by the first sub-pixel included in a second unit pixel of the plurality of unit pixels adjacent to the first unit pixel along a row direction, the second sub-pixel included in the first unit pixels may emit light having a color different from a color of light emitted by the second sub-pixel included in the second unit pixel, and the third sub-pixel included in the first unit pixels may emit light having a color different from a color of light emitted by the third sub-pixel included in the second unit pixel.

In example embodiments, the first sub-pixel included in a first unit pixel of the plurality of unit pixels may emit light having a color the same as a color of light emitted by the first sub-pixel included in a second unit pixel of the plurality of unit pixels adjacent to the first unit pixel along a row direction, the second sub-pixel included in the first unit pixels may emit light having a color the same as a color of light emitted by the second sub-pixel included in the second unit pixel, and the third sub-pixel included in the first unit pixels may emit light having a color the same as a color of light emitted by the third sub-pixel included in the second unit pixel.

In example embodiments, the plurality of unit pixels may include first unit pixels located in a first row of the display panel, and second unit pixels located in a second row of the display panel adjacent to the first row, and the third sub-pixels included in the first unit pixels may mesh with the first sub-pixels included in the second unit pixels in a sawtooth shape.

In example embodiments, one of the first unit pixels may be adjacent to two of the second unit pixels, and at least one side of the third sub-pixel included in the one of the first unit pixels may adjoin at least one side of the first sub-pixel included in each of the two of the second unit pixels.

In example embodiments, the third sub-pixel included in one of the first unit pixels may emit light having one of a red color, a green color, and a blue color, and the first sub-pixel included in one of the second unit pixels adjacent to the one of the first unit pixels may emit light having another one of the red color, the green color, and the blue color, and the third sub-pixel included in the one of the first unit pixels and the first sub-pixel included in the one of the second unit pixels, when combined, may emit light having one of a magenta color, a yellow color, and a cyan color.

In example embodiments, the first sub-pixel, the second sub-pixel, and the third sub-pixel may be sequentially located in a row direction.

In example embodiments, the first sub-pixel included in a first unit pixel of the plurality of unit pixels may emit light having a color different from a color of light emitted by the first sub-pixel included in a second unit pixel of the plurality of unit pixels adjacent to the first unit pixel along a column direction, the second sub-pixel included in the first unit pixel may emit light having a color different from a color of light emitted by the second sub-pixel included in the second unit pixel, and the third sub-pixel included in the first unit pixel may emit light having a color different from a color of light emitted by the third sub-pixel included in the second unit pixel.

In example embodiments, the first sub-pixel included in a first unit pixel of the plurality of unit pixels may emit light having a color the same as a color of light emitted by the first sub-pixel included in a second unit pixel of the plurality of unit pixels adjacent to the first unit pixel along a column direction, the second sub-pixel included in the first unit pixel may emit light having a color the same as a color of light emitted by the second sub-pixel included in the second unit pixel, and the third sub-pixel included in the first unit pixel may emit light having a color the same as a color of light emitted by the third sub-pixel included in the second unit pixel.

In example embodiments, the plurality of unit pixels may include first unit pixels located in a first column of the display panel, and second unit pixels located in a second column of the display panel adjacent to the first column, and the third sub-pixels included in the first unit pixels may mesh with the first sub-pixels included in the second unit pixels in a sawtooth shape.

In example embodiments, one of the first unit pixels may be adjacent to two of the second unit pixels, and at least one side of the third sub-pixel included in the one of the first unit pixels may adjoin at least one side of the first sub-pixel included in each of the two of the second unit pixels.

In example embodiments, the third sub-pixel included in one of the first unit pixels may emit light having one of a red color, a green color, and a blue color, and the first sub-pixel included in one of the second unit pixels adjacent to the one of the first unit pixels may emit light having another one of the red color, the green color, and the blue color, and the third sub-pixel included in the one of the first unit pixels and the first sub-pixel included in the one of the second unit pixels, when combined, may emit light having one of a magenta color, a yellow color, and a cyan color.

In example embodiments, an area of the first sub-pixel may be the same as an area of the third sub-pixel.

In example embodiments, an area of the second sub-pixel may be the same as the area of the first sub-pixel or the third sub-pixel.

According to some example embodiments, a display device includes a display panel including a plurality of unit pixels, a scan driving unit configured to provide a scan signal to the display panel, a data driving unit configured to provide a data signal to the display panel, and a timing control unit configured to control the scan driving unit and the data driving unit. Each of the plurality of unit pixels includes a first sub-pixel having a polygonal shape having five or more sides, a second sub-pixel having a rectangular shape, and a third sub-pixel having the polygonal shape having the five or more sides. The first, second and third sub-pixels emit light having different colors from each other. The first sub-pixel and the third sub-pixel are symmetrically arranged with respect to the second sub-pixel.

In example embodiments, each of the first sub-pixel and the third sub-pixel may have a pentagonal shape, and each of the plurality of unit pixels may have a hexagonal shape.

In example embodiments, each of the first sub-pixel and the third sub-pixel may have a hexagonal shape, and each of the plurality of unit pixels may have an octagonal shape.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
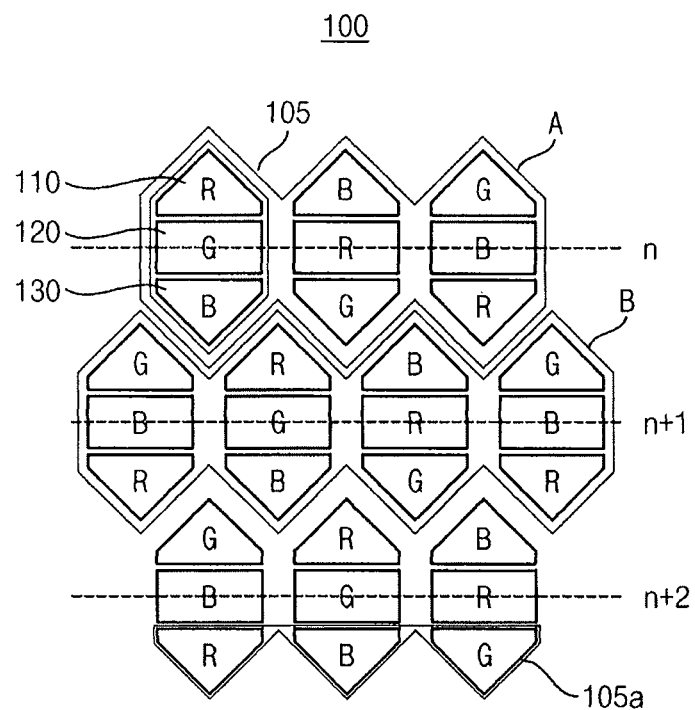
FIG. 1 illustrates a diagram of a display panel in accordance with example embodiments.

Various example embodiments will be described more fully hereinafter with reference to the accompanying drawings, in which some example embodiments are shown. The example embodiments may, however, be embodied in many different forms and should not be construed as limited to those set forth herein. Rather, these example embodiments are provided so that this disclosure will be thorough and complete, and will fully convey the scope of the exemplary implementations to those skilled in the art. In the drawings, the sizes and relative sizes of layers and regions may be exaggerated for clarity. Like numerals refer to like elements throughout.

It will be understood that although the terms first, second, third etc. may be used herein to describe various elements, these elements should not be limited by these terms. These terms are used to distinguish one element from another. Thus, a first element discussed below could be termed a second element without departing from the teachings of the example embodiments. As used herein, the term "and/or" includes any and all combinations of one or more of the associated listed items.

It will be also understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," "one" versus "directly on" etc.).

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a diagram of a display panel in accordance with example embodiments. Referring to FIG. 1, a display panel 100 may include a plurality of unit pixels 105.

Each of the unit pixels 105 may include a first sub-pixel 110, a second sub-pixel 120, and a third sub-pixel 130. Each of the unit pixels 105 may have a vertically long hexagonal shape. In some example embodiments, an area, e.g., size, of the first sub-pixel 110 may be the same as an area of the third sub-pixel 130. Additionally, in some example embodiments, an area of the second sub-pixel 120 may be the same as the area of the first sub-pixel 110 or the third sub-pixel 130.

The first sub-pixel 110, the second sub-pixel 120, and the third sub-pixel 130 may be sequentially located in a column direction in each of the unit pixels 105. However, arrangement of the first sub-pixel 110, the second sub-pixel 120, and the third sub-pixel 130 is not limited thereto. For example, the first sub-pixel 110, the second sub-pixel 120, and the third sub-pixel 130 may be sequentially located in a row direction in each of the unit pixels 105. The first sub-pixel 110 and the third sub-pixel 130 may be symmetrically arranged with respect to the second sub-pixel 120, e.g., the second sub-pixel 120 may be between the first and third sub-pixels 110 and 130.

The first sub-pixel 110 may emit a first color light, and may have a polygonal shape having five or more sides, e.g., a pentagonal shape. However, the shape of the first sub-pixel 110 is not limited thereto. For example, the first sub-pixel 110 may have a hexagonal shape. In some example embodiments, the color of the first color light emitted by the first sub-pixel 110 may be one of a red color, a blue color, and a green color.

The second sub-pixel 120 may emit a second color light, and may have a rectangular shape. For example, the second sub-pixel 120 may be disposed in a center part of each of the unit pixels 105. In some example embodiments, the color of the second color light emitted by the second sub-pixel 120 may be another one of the red color, the blue color and the green color, i.e., the color of the second color light emitted by the second sub-pixel 120 may be a different color than that emitted by the first sub-pixel 110.

The third sub-pixel 130 may emit a third color light and may have a polygonal shape having five or more sides (e.g., the pentagonal shape). However, the shape of the third sub-pixel 130 is not limited thereto. For example, the third sub-pixel 130 may have a hexagonal shape. The shape of the third sub-pixel 130 may be identical to that of the second sub-pixel 120. In some example embodiments, the color of the third color light emitted by the third sub-pixel 130 may be the other one of the red color, the blue color, and the green color, i.e., the color of the third color light emitted by the third sub-pixel 130 may be a different color than that emitted by the first and second sub-pixels 110 and 120.

In some example embodiments, the first sub-pixel 110, the second sub-pixel 120, and the third sub-pixel 130 may include a first organic layer pattern, a second organic layer pattern, and a third organic layer pattern, respectively. The first organic layer pattern, the second organic layer pattern, and the third organic layer pattern may emit the first color light, the second color light, and the third color light, respectively. In some example embodiments, the first organic layer pattern, the second organic layer pattern, and the third organic layer pattern may be formed by a pattern masking process. For example, the mask may include a fine metal mask, a shadow mask, etc.

In example embodiments, when the first, second, and third sub-pixels 110, 120, and 130 are sequentially located in the column direction in each unit pixel 105, the first sub-pixel 110 included in one unit pixel 105 may emit light having a color different from a color of light emitted by the first sub-pixel included in an adjacent unit pixel 105 along the row direction. Further, the second sub-pixel 120 included in the one unit pixel 105 may emit light having a color different from a color of light emitted by the second sub-pixel included in the adjacent unit pixel 105, and the third sub-pixel 130 included in the one unit pixel 105 may emit light having a color different from a color of light emitted by the third sub-pixel included in the adjacent unit pixel 105.

As described above, the sub-pixels (e.g., the first sub-pixel 110, the second sub-pixel 120, and the third sub-pixel 130) may be sequentially arranged in the column direction, and the arrangement of the sub-pixels included in one unit pixel 105 may be different from an arrangement of the sub-pixels included in another unit pixel 105 adjacent to the one unit pixel 105 along the row direction. Further, the arrangement of the sub-pixels included in the other, e.g., adjacent, unit pixel 105 may be different from that of the sub-pixels included in still another unit pixel 105 adjacent to the other unit pixel 105 along the row direction. For example, each of three adjacent unit pixels 105 along the row direction may have a different arrangement of sub-pixels therein. Thus, while the sub-pixels may be sequentially arranged in the column direction in each unit pixel 105, an additional unit pixel 105a may be further formed to include sub-pixels arranged along the row direction. Accordingly, in the display panel 100, each unit pixel 105 may include sub-pixels sequentially arranged in the column direction, or each unit pixel 105a may include sub-pixels sequentially arranged in the row direction.

As illustrated in FIG. 1, the display panel 100 may include first unit pixels A located in a first row (e.g., an (n)th row) of the display panel 100, and second unit pixels B located in a second row (e.g., an (n+1)th row) of the display panel 100 adjacent to the first row. The third sub-pixels 130 included in the first unit pixels A may mesh, e.g., interlock, with the first sub-pixels included in the second unit pixels B in a complementary shape, e.g., in a sawtooth shape. Additionally, one of the first unit pixels A may be adjacent to two of the second unit pixels B, and at least one side of the third sub-pixel 130 included in the one of the first unit pixels A may adjoin, e.g., contact and extend along, at least one side of the first sub-pixel included in each of the two of the second unit pixels B. Accordingly, a distance among adjacent unit pixels 105 may be decreased, which results in a high resolution of the display panel 100.

In example embodiments, the third sub-pixel 130 included in one of the first unit pixels A and the first sub-pixel included in one of the second unit pixels B adjacent to the one of the first unit pixels A, when combined, may emit one of a fourth color light, a fifth color light, and a sixth color light. For example, the third sub-pixel 130 included in the one of the first unit pixels A and the first sub-pixel included in the one of the second unit pixels B may emit light having one of a magenta color, a yellow color, and a cyan color.

In a conventional display device, each sub-pixel has a rectangular shape or a square shape, and sub-pixels are sequentially disposed in each unit pixel. Thus, each unit pixel also has a rectangular shape or a square shape, which results in a predetermined number of pixel rows/columns, thereby limiting resolution of the display device. However, in the display panel 100 according to example embodiments, each unit pixel 105 may include the first sub-pixel 110 having the polygonal shape having the five or more sides (e.g., a pentagonal shape), the second sub-pixel 120 having the rectangular shape, and the third sub-pixel 130 having the polygonal shape having the five or more sides (e.g., a pentagonal shape). The first sub-pixel 110 and the third sub-pixel 130 may be symmetrically arranged with respect to the second sub-pixel 120, so each unit pixel 105 may have an overall polygonal shape having six or more sides (e.g., a hexagonal shape). As a result, in the display panel 100 according to example embodiment, a distance between adjacent unit pixels 105 may be decreased to have an increased number of columns/rows of unit pixels as compared to the predetermined number of the conventional display device, which results in a high resolution of the display panel 100. Additionally, a sub-pixel included in the unit pixel 105 emitting one of the first, second, and third color light and an adjacent sub-pixel included in an adjacent unit pixel emitting another one of the first, second, and third color light may be interactively driven to emit one of the fourth color light, the fifth color light, and the sixth color light. Accordingly, the display panel 100 according to example embodiments may improve color reproduction performance, and thus may display high-quality images.

Furthermore, in some example embodiments, the sub-pixels may be sequentially arranged in one direction of the column direction and the row direction in one unit pixel 105, and arrangement of the sub-pixels included in the one unit pixel 105 may be different from an arrangement of the sub-pixels included in another unit pixel adjacent to the one unit pixel 105 along the other direction of the column direction and the row direction. Thus, while the sub-pixels are sequentially arranged in the one direction of the column direction and the row direction in each unit pixel 105, an additional unit pixel 105a may be further formed along the other direction of the column direction and the row direction. Accordingly, in the display panel 100 according to example embodiments, each unit pixel 105 where the sub-pixels are sequentially arranged in the one direction of the column direction and the row direction may be used, or alternatively each unit pixel 105a where the sub-pixels are sequentially arranged in the other direction of the column direction and the row direction may be used. Therefore, the display panel 100 according to example embodiments may have improved display ability, and may provide high-quality images.

Figure 2A:
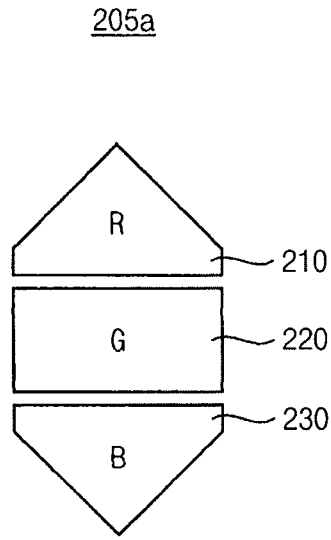
FIG. 2A through 2C illustrate diagrams of examples where a first sub-pixel through a third sub-pixel are disposed in each unit pixel of the display panel of FIG. 1.
Figure 2B:
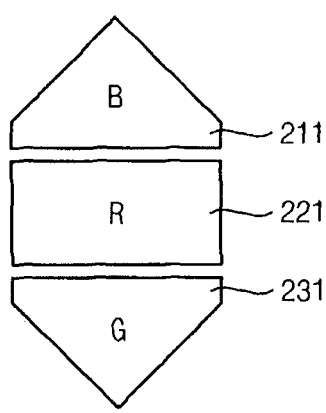
Figure 2C:
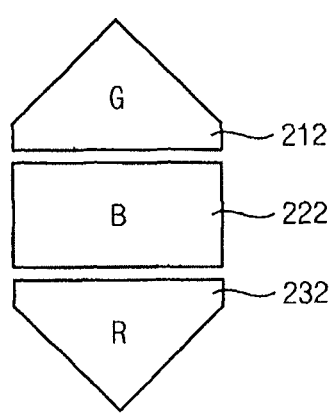

FIG. 2A through 2C illustrate diagrams illustrating of where a first sub-pixel through a third sub-pixel are disposed in a unit pixel of a display panel of FIG. 1.

Referring to FIG. 2A, a unit pixel 205a may include a first sub-pixel 210, a second sub-pixel 220, and a third sub-pixel 230. For example, an area of the first sub-pixel 210 may be the same as an area of the third sub-pixel 230. Additionally, an area of the second sub-pixel 220 may be the same as the area of the first sub-pixel 210 or the third sub-pixel 230.

The second sub-pixel 220 may have a rectangular shape. For example, the second sub-pixel 220 may be disposed in a center part of each of the unit pixels 205a. The second sub-pixel 220 may emit a second color light (e.g., a green color light).

Each of the first sub-pixel 210 and the third sub-pixel 230 may have a polygonal shape having five or more sides (e.g., a pentagonal shape), and the first sub-pixel 210 and the third sub-pixel 230 may be symmetrically arranged with respect to the second sub-pixel 220. The first sub-pixel 210 may emit a first color light (e.g., a red color light), and the third sub-pixel 230 may emit a third color light (e.g., a blue color light).

The first sub-pixel 210, the second sub-pixel 220, and the third sub-pixel 230 may include a first organic layer pattern, a second organic layer pattern, and a third organic layer pattern, respectively. The first organic layer pattern, the second organic layer pattern, and the third organic layer pattern may emit the first color light, the second color light, and the third color light, respectively. In some example embodiments, the first organic layer pattern, the second organic layer pattern, and the third organic layer pattern may be formed by a pattern masking process.

Referring to FIG. 2B, a unit pixel 205b may include a first sub-pixel 211, a second sub-pixel 221, and a third sub-pixel 231. For example, an area of the first sub-pixel 211 may be the same as an area of the third sub-pixel 231. Additionally, an area of the second sub-pixel 221 may be the same as the area of the first sub-pixel 211 or the third sub-pixel 231.

As illustrated in FIG. 2B, the first sub-pixel 211 may emit a first color light, and the first color light may correspond to a blue color light. The second sub-pixel 221 may emit a second color light, and the second color light may correspond to a red color light. The third sub-pixel 231 may emit a third color light, and the third color light may correspond to a green color light.

Referring to FIG. 2C, a unit pixel 205c may include a first sub-pixel 212, a second sub-pixel 222, and a third sub-pixel 232. For example, an area of the first sub-pixel 212 may be the same as an area of the third sub-pixel 232. Additionally, an area of the second sub-pixel 222 may be the same as the area of the first sub-pixel 212 or the third sub-pixel 232.

As illustrated in FIG. 2C, the first sub-pixel 212 may emit a first color light, and the first color light may correspond to a green color light. The second sub-pixel 222 may emit a second color light, and the second color light may correspond to a blue color light. The third sub-pixel 232 may emit a third color light, and the third color light may correspond to a red color light.

Figure 3:
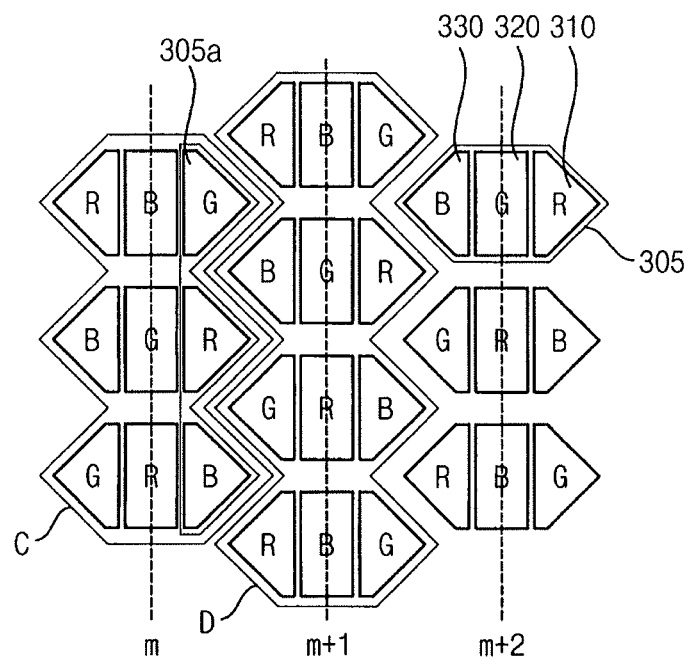
FIG. 3 illustrates a diagram of a display panel in accordance with example embodiments.

FIG. 3 illustrates a diagram of a display panel in accordance with example embodiments. Referring to FIG. 3, a display panel 300 may include a plurality of unit pixels 305.

Each of the unit pixels 305 may include a first sub-pixel 310, a second sub-pixel 320, and a third sub-pixel 330. Each of the unit pixels 305 may have a horizontally elongated hexagonal shape. In some example embodiments, an area of the first sub-pixel 310 may be the same as an area of the third sub-pixel 330. Additionally, in some example embodiments, an area of the second sub-pixel 320 may be the same as the area of the first sub-pixel 310 or the third sub-pixel 330.

The first sub-pixel 310, the second sub-pixel 320, and the third sub-pixel 330 may be sequentially located in a row direction in each of the unit pixels 305. The first sub-pixel 310 and the third sub-pixel 330 may be symmetrically arranged with respect to the second sub-pixel 320.

The first sub-pixel 310 may emit a first color light and may have a polygonal shape having five or more sides (e.g., a pentagonal shape). The second sub-pixel 320 may emit a second color light and may have a rectangular shape. The third sub-pixel 330 may emit a third color light and may have a polygonal shape having five or more sides (e.g., a pentagonal shape). In some example embodiments, the color of the first color light emitted by the first sub-pixel 310 may be one of a red color, a blue color, and a green color, the color of the second color light emitted by the second sub-pixel 320 may be another one of the red color, the blue color, and the green color, and the color of the third color light emitted by the third sub-pixel 330 may be the other one of the red color, the blue color, and the green color.

In example embodiments, the first sub-pixel 310 included in one unit pixel 305 may emit light having a color different from a color of light emitted by the first sub-pixel included in another unit pixel adjacent to the one unit pixel along a column direction, the second sub-pixel 320 included in the one unit pixel 305 may emit light having a color different from a color of light emitted by the second sub-pixel included in the other unit pixel, and the third sub-pixel 330 included in the one unit pixel 305 may emit light having a color different from a color of light emitted by the third sub-pixel included in the other unit pixel.

As described above, the sub-pixels (e.g., the first sub-pixel 310, the second sub-pixel 320, and the third sub-pixel 330) may be sequentially arranged in the row direction in the one unit pixel 305, and the arrangement of the sub-pixels included in the one unit pixel 305 may be different from an arrangement of the sub-pixels included in the other unit pixel adjacent to the one unit pixel along the column direction. Further, the arrangement of the sub-pixels included in the other unit pixel may be different from the arrangement of the sub-pixels included in still another unit pixel adjacent to the other unit pixel along the column direction. Further, while sub-pixels may be sequentially arranged in the row direction in each unit pixel 305, an additional unit pixel 305a may be further formed along the column direction. Accordingly, in the display panel 100 according to example embodiments, each unit pixel 305 may include sub-pixels sequentially arranged in the row direction, or each unit pixel 305a may include sub-pixels sequentially arranged in the column direction.

As illustrated in FIG. 3, the display panel 300 may include first unit pixels C located in a first column (e.g., a (m)th column) of the display panel 300, and second unit pixels D located in a second column (e.g., a (m+1)th column) of the display panel 300 adjacent to the first column. The third sub-pixels 330 included in the first unit pixels C may mesh with the first sub-pixels included in the second unit pixels D, e.g., in a sawtooth shape. Additionally, one of the first unit pixels C may be adjacent to two of the second unit pixels D, and at least one side of the third sub-pixel 330 included in the one of the first unit pixels C may adjoin at least one side of the first sub-pixel included in each of the two of the second unit pixels D. Accordingly, a distance between adjacent unit pixels may be decreased, which results in a high resolution of the display panel 300.

In example embodiments, the third sub-pixel 330 included in one of the first unit pixels C and the first sub-pixel included in one of the second unit pixels D adjacent to the one of the first unit pixels C, when combined, may emit one of a fourth color light, a fifth color light, and a sixth color light. For example, the third sub-pixel 330 included in the one of the first unit pixels C and the first sub-pixel included in the one of the second unit pixels D may emit light having one of a magenta color, a yellow color, and a cyan color.

Figure 4:
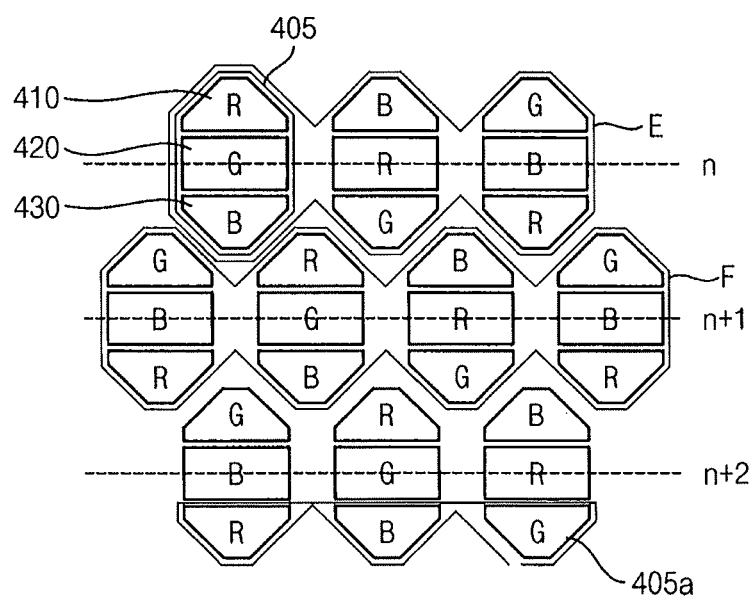
FIG. 4 illustrates a diagram of a display panel in accordance with example embodiments.

FIG. 4 illustrates a diagram of a display panel in accordance with example embodiments.

Since a display panel 400 of FIG. 4 has a structure substantially the same as or substantially similar to the display panel 100 of FIG. 1, except for a shape of each of the unit pixels 405, duplicate descriptions will be omitted below. Referring to FIG. 4, the display panel 400 may include the plurality of unit pixels 405.

Each of the unit pixels 405 may include a first sub-pixel 410, a second sub-pixel 420, and a third sub-pixel 430. Each of the unit pixels 305 may have a vertically elongated octagonal shape. In some example embodiments, an area of the first sub-pixel 410 may be the same as an area of the third sub-pixel 430. Additionally, in some example embodiments, an area of the second sub-pixel 420 may be the same as the area of the first sub-pixel 410 or the third sub-pixel 430.

The first sub-pixel 410, the second sub-pixel 420, and the third sub-pixel 430 may be sequentially located in a column direction in each of the unit pixels 405. The first sub-pixel 410 and the third sub-pixel 430 may be symmetrically arranged with respect to the second sub-pixel 420.

The first sub-pixel 410 may emit a first color light and may have a polygonal shape having five or more sides (e.g., a hexagonal shape). The second sub-pixel 420 may emit a second color light and may have a rectangular shape. The third sub-pixel 430 may emit a third color light and may have a polygonal shape having five or more sides (e.g., a hexagonal shape). In some example embodiments, the color of the first color light emitted by the first sub-pixel 410 may be one of a red color, a blue color, and a green color, the color of the second color light emitted by the second sub-pixel 420 may be another one of the red color, the blue color, and the green color, and the color of the third color light emitted by the third sub-pixel 430 may be another one of the red color, the blue color, and the green color.

In example embodiments, when the first, second, and third sub-pixels 410, 420, and 430 are sequentially located in the column direction in each unit pixel 405, the first sub-pixel 410 included in one unit pixel 405 may emit light having a color different from a color of light emitted by the first sub-pixel included in another unit pixel adjacent to the one unit pixel 405 along a row direction. Further, the second sub-pixel 420 included in the one unit pixel 405 may emit light having a color different from a color of light emitted by the second sub-pixel included in the other unit pixel, and the third sub-pixel 430 included in the one unit pixel 405 may emit light having a color different from a color of light emitted by the third sub-pixel included in the other unit pixel.

As described above, the sub-pixels (e.g., the first sub-pixel 410, the second sub-pixel 420, and the third sub-pixel 430) may be sequentially arranged in the column direction in the one unit pixel, and the arrangement of the sub-pixels included in the one unit pixel may be different from arrangement of the sub-pixels included in the other unit pixel adjacent to the one unit pixel along the row direction. Further, the arrangement of the sub-pixels included in the other unit pixel may be different from the arrangement of the sub-pixels included in still another unit pixel adjacent to the other unit pixel along the row direction. Thus, while the sub-pixels may be sequentially arranged in the column direction in each unit pixel 405, an additional unit pixel 405a may be further formed along the row direction. Accordingly, in the display panel 400 according to example embodiments, each unit pixel 405 where the sub-pixels are sequentially arranged in the column direction may be used, or alternatively each unit pixel 405a where the sub-pixels are sequentially arranged in the row direction may be used.

As illustrated in FIG. 4, the display panel 400 may include first unit pixels E located in a first row (e.g., an (n)th row) of the display panel 400, and second unit pixels F located in a second row (e.g., an (n+1)th row) of the display panel 400 adjacent to the first row. The third sub-pixels 430 included in the first unit pixels E may mesh with the first sub-pixels included in the second unit pixels F, e.g., in a sawtooth shape. Additionally, one of the first unit pixels E may be adjacent to two of the second unit pixels F, and at least one side of the third sub-pixel 430 included in the one of the first unit pixels E may adjoin at least one side of the first sub-pixel included in each of the two of the second unit pixels F. Accordingly, a distance between adjacent unit pixels may be decreased, which results in the high resolution of the display panel 400.

In example embodiments, the third sub-pixel 430 included in one of the first unit pixels E and the first sub-pixel included in one of the second unit pixels F adjacent to the one of the first unit pixels E, when combined, may emit one of a fourth color light, a fifth color light and a sixth color light. For example, the third sub-pixel 430 included in the one of the first unit pixels E and the first sub-pixel included in the one of the second unit pixels F may emit light having one of a magenta color, a yellow color, and a cyan color.

Figure 5:
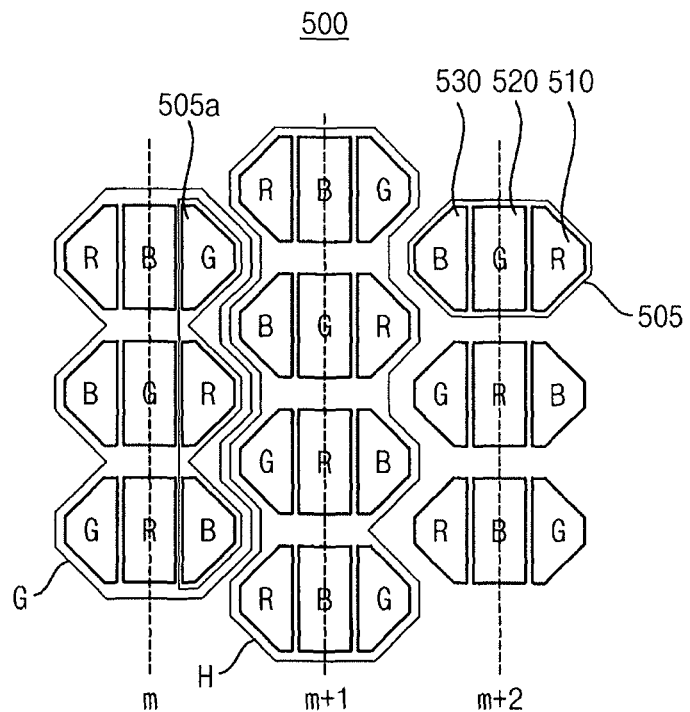
FIG. 5 illustrates a diagram of a display panel in accordance with example embodiments.

FIG. 5 illustrates a diagram of a display panel in accordance with example embodiments.

Since a display panel 500 of FIG. 5 has a structure substantially the same as or substantially similar to the display panel 300 of FIG. 3, except for a shape of a unit pixel 505, duplicate descriptions will be omitted below. Referring to FIG. 5, the display panel 500 may include the plurality of unit pixels 505.

Each of the unit pixels 505 may include a first sub-pixel 510, a second sub-pixel 520, and a third sub-pixel 530. Each of the unit pixels 505 may have a horizontally long octagonal shape. In some example embodiments, an area of the first sub-pixel 510 may be the same as an area of the third sub-pixel 530. Additionally, in some example embodiments, an area of the second sub-pixel 520 may be the same as the area of the first sub-pixel 510 or the third sub-pixel 530.

The first sub-pixel 510, the second sub-pixel 520, and the third sub-pixel 530 may be sequentially located in a row direction in each of the unit pixels 505. The first sub-pixel 510 and the third sub-pixel 530 may be symmetrically arranged with respect to the second sub-pixel 520.

The first sub-pixel 510 may emit a first color light and may have a polygonal shape having the five or more sides (e.g., a hexagonal shape). The second sub-pixel 520 may emit a second color light and may have a rectangular shape. The third sub-pixel 530 may emit a third color light and may have a polygonal shape having the five or more sides (e.g., the hexagonal shape). In some example embodiments, the color of the first color light emitted by the first sub-pixel 510 may be one of a red color, a blue color and a green color, the color of the second color light emitted by the second sub-pixel 520 may be another one of the red color, the blue color and the green color, and the color of the third color light emitted by the third sub-pixel 530 may be the other one of the red color, the blue color and the green color.

In example embodiments, the first sub-pixel 510 included in one unit pixel 505 may emit light having a color different from a color of light emitted by the first sub-pixel included in another unit pixel adjacent to the one unit pixel 505 along a column direction. Further, the second sub-pixel 520 included in the one unit pixel 505 may emit light having a color different from a color of light emitted by the second sub-pixel included in the other unit pixel, and the third sub-pixel 530 included in the one unit pixel 505 may emit light having a color different from a color of light emitted by the third sub-pixel included in the other unit pixel.

As described above, the sub-pixels (e.g., the first sub-pixel 510, the second sub-pixel 520, and the third sub-pixel 530) may be sequentially arranged in the row direction in the one unit pixel 505, and the arrangement of the sub-pixels included in the one unit pixel 505 may be different from arrangement of the sub-pixels included in the other unit pixel adjacent to the one unit pixel along the column direction. Further, the arrangement of the sub-pixels included in the other unit pixel may be different from arrangement of the sub-pixels included in still another unit pixel adjacent to the other unit pixel along the column direction. Thus, while the sub-pixels may be sequentially arranged in the row direction in each unit pixel 505, an additional unit pixel 505a may be further formed along the column direction. Accordingly, in the display panel 500 according to example embodiments, each unit pixel 505 where the sub-pixels are sequentially arranged in the row direction may be used, or alternatively each unit pixel 505a where the sub-pixels are sequentially arranged in the column direction may be used.

As illustrated in FIG. 5, the display panel 500 may include first unit pixels G located in a first column (e.g., a (m)th column) of the display panel 500, and second unit pixels H located in a second column (e.g., a (m+1)th column) of the display panel 500 adjacent to the first column. The third sub-pixels 530 included in the first unit pixels G may mesh with the first sub-pixels included in the second unit pixels H in a sawtooth shape. Additionally, one of the first unit pixels G may be adjacent to two of the second unit pixels H, and at least one side of the third sub-pixel 330 included in the one of the first unit pixels G may adjoin at least one side of the first sub-pixel included in each of the two of the second unit pixels H. Accordingly, a distance between adjacent unit pixels may be decreased, which results in the high resolution of the display panel 500.

In example embodiments, the third sub-pixel 530 included in one of the first unit pixels G and the first sub-pixel included in one of the second unit pixels H adjacent to the one of the first unit pixels G, may emit one of a fourth color light, a fifth color light and a sixth color light. For example, the third sub-pixel 530 included in the one of the first unit pixels A and the first sub-pixel included in the one of the second unit pixels H may emit light having one of a magenta color, a yellow color, and a cyan color.

Figure 6:
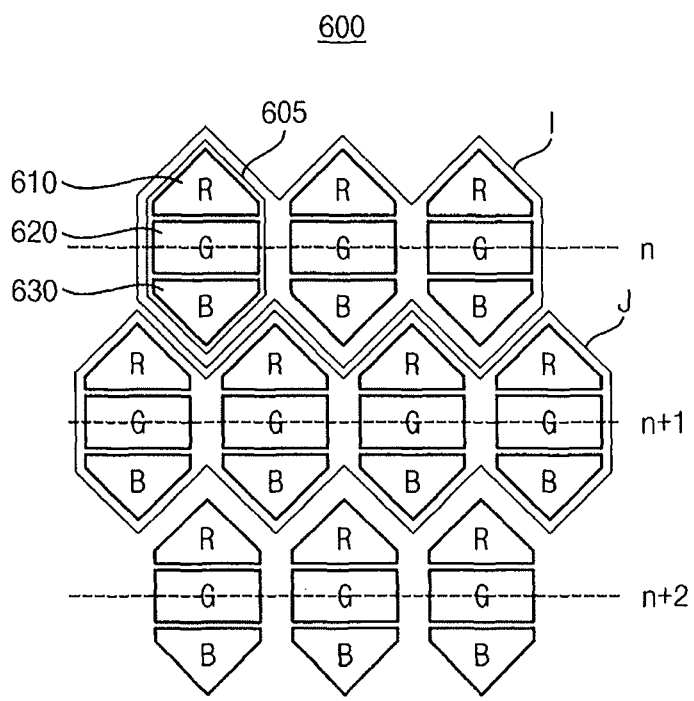
FIG. 6 illustrates a diagram of a display panel in accordance with example embodiments.

FIG. 6 illustrates a diagram of a display panel in accordance with example embodiments.

Since a display panel 600 of FIG. 6 has a structure substantially the same as or substantially similar to the display panel 100 of FIG. 1, except for arrangement of sub-pixels included in a unit pixel 605, duplicate descriptions will be omitted below. Referring to FIG. 6, the display panel 600 may include the plurality of unit pixels 605.

Each of the unit pixels 605 may include a first sub-pixel 610, a second sub-pixel 620, and a third sub-pixel 630. Each of the unit pixels 605 may have a vertically long hexagonal shape. In some example embodiments, an area of the first sub-pixel 610 may be the same as an area of the third sub-pixel 630. Additionally, in some example embodiments, an area of the second sub-pixel 620 may be the same as the area of the first sub-pixel 610 or the third sub-pixel 630.

The first sub-pixel 610, the second sub-pixel 620, and the third sub-pixel 630 may be sequentially located in a column direction in each of the unit pixels 605. The first sub-pixel 610 and the third sub-pixel 630 may be symmetrically arranged with respect to the second sub-pixel 620. Additionally, an area of the second sub-pixel 620 may be the same as the area of the first sub-pixel 610 or the third sub-pixel 630.

The first sub-pixel 610, the second sub-pixel 620, and the third sub-pixel 630 may be sequentially located in a column direction in each of the unit pixels 605. The first sub-pixel 610 and the third sub-pixel 630 may be symmetrically arranged with respect to the second sub-pixel 620.

The first sub-pixel 610 may emit a first color and may have a polygonal shape having the five or more sides (e.g., a pentagonal shape). The second sub-pixel 620 may emit a second color and may have a rectangular shape. The third sub-pixel 630 may emit a third color and may have a polygonal shape having the five or more sides (e.g., the pentagonal shape). In some example embodiments, the color of the first color light emitted by the first sub-pixel 610 may be one of a red color, a blue color, and a green color, the color of the second color light emitted by the second sub-pixel 620 may be another one of the red color, the blue color, and the green color, and the color of the third color light emitted by the third sub-pixel 630 may be the other one of the red color, the blue color, and the green color.

In example embodiments, when the first, second, and third sub-pixels 610, 620, and 630 are sequentially located in the column direction in each unit pixel 605 the first sub-pixel 610 included in one unit pixel 605 may emit light having a color the same as a color of light emitted by the first sub-pixel included in another unit pixel adjacent to the one unit pixel a second unit pixel 605 along the row direction. Further, the second sub-pixel 620 included in the one unit pixel 605 may emit light having a color the same as a color of light emitted by the second sub-pixel included in the other unit pixel, and the third sub-pixel 630 included in the one unit pixel 605 may emit light having a color the same as a color of light emitted by the third sub-pixel included in the other unit pixel.

As illustrated in FIG. 6, the display panel 600 may include first unit pixels I located in a first row (e.g., an (n)th row) of the display panel 600, and second unit pixels J located in a second row (e.g., an (n+1)th row) of the display panel 600 adjacent to the first row. The third sub-pixels 630 included in the first unit pixels I may mesh with the first sub-pixels included in the second unit pixels J in a sawtooth shape. Additionally, one of the first unit pixels I may be adjacent to two of the second unit pixels J, and at least one side of the third sub-pixel 630 included in the one of the first unit pixels I may adjoin at least one side of the first sub-pixel included in each of the two of the second unit pixels J. Accordingly, a distance between adjacent unit pixels may be decreased, which results in the high resolution of the display panel 600.

In example embodiments, the third sub-pixel 630 included in one of the first unit pixels I and the first sub-pixel included in one of the second unit pixels B adjacent to the one of the first unit pixels I, when combined, may emit one of a fourth color light, a fifth color light and a sixth color light. For example, the third sub-pixel 630 included in the one of the first unit pixels I and the first sub-pixel included in the one of the second unit pixels J may emit light having one of a magenta color, a yellow color, and a cyan color.

The first sub-pixel 610 included in each unit pixel 605 and the first sub-pixel included in another unit pixel adjacent to the each unit pixel 605 may emit the same color. The second sub-pixel 620 included in the each unit pixel 605 and the second sub-pixel included in the other unit pixel may emit the same color. The third sub-pixel 630 included in each unit pixel 605 and the third sub-pixel included in the other unit pixel may emit the same color. Accordingly, the first organic layer pattern through the third organic layer pattern may be formed at the same time using the same opening portion of the mask.

Figure 7:
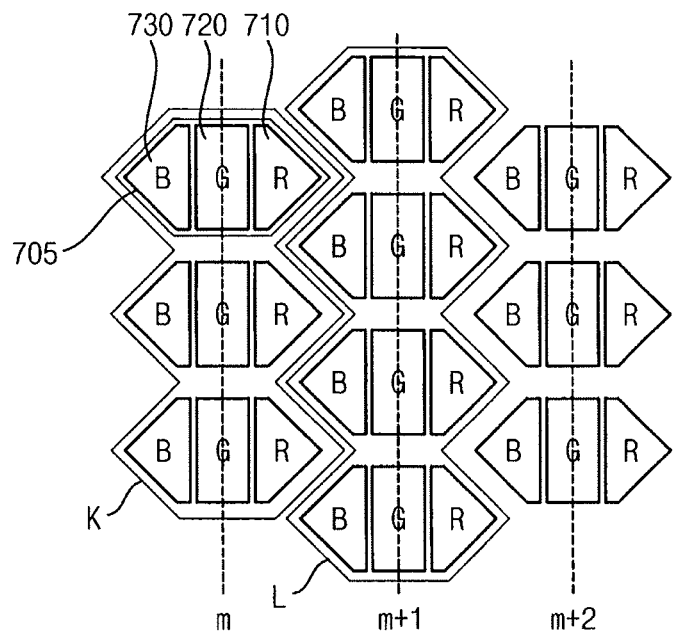
FIG. 7 illustrates a diagram of a display panel in accordance with example embodiments.

FIG. 7 illustrates a diagram of a display panel in accordance with example embodiments.

Since a display panel 700 of FIG. 7 has a structure substantially the same as or substantially similar to the display panel 300 of FIG. 3, except for arrangement of sub-pixels included in a unit pixel 705, duplicate descriptions will be omitted below. Referring to FIG. 7, the display panel 700 may include the plurality of unit pixels 705.

Each of the unit pixels 705 may include a first sub-pixel 710, a second sub-pixel 720, and a third sub-pixel 730. Each of the unit pixels 705 may have a horizontally long hexagonal shape. In some example embodiments, an area of the first sub-pixel 710 may be the same as an area of the third sub-pixel 730. Additionally, in some example embodiments, an area of the second sub-pixel 720 may be the same as the area of the first sub-pixel 710 or the third sub-pixel 730.

The first sub-pixel 710, the second sub-pixel 720, and the third sub-pixel 730 may be sequentially located in a row direction in each of the unit pixels 705. The first sub-pixel 710 and the third sub-pixel 730 may be symmetrically arranged with respect to the second sub-pixel 720.

The first sub-pixel 710 may emit a first color light and may have a polygonal shape having the five or more sides (e.g., a pentagonal shape). The second sub-pixel 720 may emit a second color light and may have a rectangular shape. The third sub-pixel 730 may emit a third color light and may have a polygonal shape having the five or more sides (e.g., the pentagonal shape). In some example embodiments, the color of the first color light emitted by the first sub-pixel 710 may be one of a red color, a blue color and a green color, the color of the second color light emitted by the second sub-pixel 720 may be another one of the red color, the blue color and the green color, and the color of the third color light emitted by the third sub-pixel 730 may be the other one of the red color, the blue color and the green color.

In example embodiments, the first sub-pixel 710 included in one unit pixel 705 may emit light having a color the same as a color of light emitted by the first sub-pixel included in another unit pixel adjacent to the one unit pixel 705 along a column direction. Further, the second sub-pixel 720 included in the one unit pixel 705 may emit light having a color the same as a color of light emitted by the second sub-pixel included in the other unit pixel, and the third sub-pixel 730 included in the one unit pixel 705 may emit light having a color the same as a color of light emitted by the third sub-pixel included in the other unit pixel.

As illustrated in FIG. 7, the display panel 700 may include first unit pixels K located in a first column (e.g., a (m)th column) of the display panel 700, and second unit pixels L located in a second column (e.g., a (m+1)th column) of the display panel 700 adjacent to the first column. The third sub-pixels 330 included in the first unit pixels K may mesh with the first sub-pixels included in the second unit pixels L in a sawtooth shape. Additionally, one of the first unit pixels K may be adjacent to two of the second unit pixels L, and at least one side of the third sub-pixel 730 included in the one of the first unit pixels K may adjoin at least one side of the first sub-pixel included in each of the two of the second unit pixels L. Accordingly, a distance between adjacent unit pixels may be decreased, which results in the high resolution of the display panel 700.

In example embodiments, the third sub-pixel 730 included in one of the first unit pixels K and the first sub-pixel included in one of the second unit pixels L adjacent to the one of the first unit pixels K, when combined, may emit one of a fourth color light, a fifth color light and a sixth color light. For example, the third sub-pixel 730 included in the one of the first unit pixels K and the first sub-pixel included in the one of the second unit pixels L may emit light having one of a magenta color, a yellow color, and a cyan color.

The first sub-pixel 710, the second sub-pixel 720, and the third sub-pixel 730 may include a first organic layer pattern, a second organic layer pattern, and a third organic layer pattern, respectively. The first organic layer pattern, the second organic layer pattern, and the third organic layer pattern may emit the first color light, the second color light, and the third color light, respectively. The first organic layer pattern, the second organic layer pattern, and the third organic layer pattern may be formed by a pattern masking process. For example, the mask may include a fine metal mask, a shadow mask, etc.

The first sub-pixel 710 included in one unit pixel 705 and the first sub-pixel included in another unit pixel adjacent to the one unit pixel 705 may emit the same color, the second sub-pixel 720 included in the one unit pixel 705 and the second sub-pixel included in the other unit pixel may emit the same color, and the third sub-pixel 730 included in one unit pixel 705 and the third sub-pixel included in the other unit pixel may emit the same color. Accordingly, the first organic layer pattern through the third organic layer pattern may be formed at the same time using the same opening portion of the mask.

Figure 8:
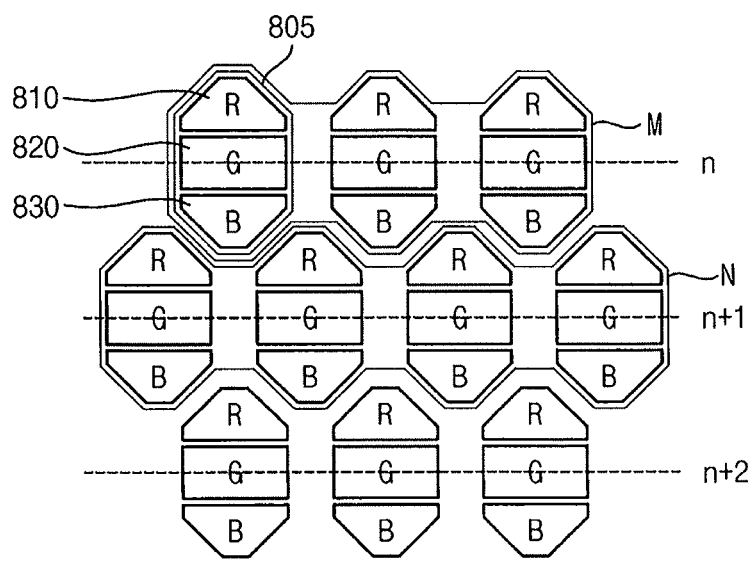
FIG. 8 illustrates a diagram of a display panel in accordance with example embodiments.

FIG. 8 illustrates a diagram of a display panel in accordance with example embodiments.

Since a display panel 800 of FIG. 8 has a structure substantially the same as or substantially similar to the display panel 600 of FIG. 6, except for a shape of a unit pixel 805, duplicated descriptions will be omitted below. Referring to FIG. 8, the display panel 800 may include the plurality of unit pixels 805.

Each of the unit pixels 805 may include a first sub-pixel 810, a second sub-pixel 820, and a third sub-pixel 830. Each of the unit pixels 805 may have a vertically long hexagonal shape. In some example embodiments, an area of the first sub-pixel 810 may be the same as an area of the third sub-pixel 830. Additionally, in some example embodiments, an area of the second sub-pixel 820 may be the same as the area of the first sub-pixel 810 or the third sub-pixel 830.

The first sub-pixel 810, the second sub-pixel 820, and the third sub-pixel 830 may be sequentially located in a column direction in each of the unit pixels 805. The first sub-pixel 810 and the third sub-pixel 830 may be symmetrically arranged with respect to the second sub-pixel 820.

The first sub-pixel 810 may emit a first color and may have a polygonal shape having the five or more sides (e.g., a hexagonal shape). The second sub-pixel 820 may emit a second color and may have a rectangular shape. The third sub-pixel 830 may emit a third color and may have a polygonal shape having the five or more sides (e.g., the hexagonal shape). In some example embodiments, the color of the first color light emitted by the first sub-pixel 810 may be one of a red color, a blue color and a green color, the color of the second color light emitted by the second sub-pixel 820 may be another one of the red color, the blue color and the green color, and the color of the third color light emitted by the third sub-pixel 830 may be the other one of the red color, the blue color and the green color.

In example embodiments, when the first, second and third sub-pixels 810, 820, and 130 are sequentially located in the column direction in each unit pixel 805, the first sub-pixel 810 included in one unit pixel 805 may emit light having a color the same as a color of light emitted by the first sub-pixel included in another unit pixel adjacent to the one unit pixel 805 along the row direction. Further, the second sub-pixel 820 included in the one unit pixel 805 may emit light having a color the same as a color of light emitted by the second sub-pixel included in the other unit pixel, and the third sub-pixel 830 included in the one unit pixel 805 may emit light having a color the same as a color of light emitted by the third sub-pixel included in the other unit pixel.

As illustrated in FIG. 8, the display panel 800 may include first unit pixels M located in a first row (e.g., an (n)th row) of the display panel 800, and second unit pixels N located in a second row (e.g., an (n+1)th row) of the display panel 800 adjacent to the first row. The third sub-pixels 830 included in the first unit pixels M may mesh with the first sub-pixels included in the second unit pixels N in a sawtooth shape. Additionally, one of the first unit pixels M may be adjacent to two of the second unit pixels N, and at least one side of the third sub-pixel 830 included in the one of the first unit pixels M may adjoin at least one side of the first sub-pixel included in each of the two of the second unit pixels N. Accordingly, a distance between adjacent unit pixels may be decreased, which results in the high resolution of the display panel 800.

In example embodiments, the third sub-pixel 830 included in one of the first unit pixels M and the first sub-pixel included in one of the second unit pixels N adjacent to the one of the first unit pixels M, when combined, may emit one of a fourth color light, a fifth color light and a sixth color light. For example, the third sub-pixel 830 included in the one of the first unit pixels M and the first sub-pixel included in the one of the second unit pixels N may emit light having one of a magenta color, a yellow color, and a cyan color.

The first sub-pixel 810, the second sub-pixel 820, and the third sub-pixel 830 may include a first organic layer pattern, a second organic layer pattern, and a third organic layer pattern, respectively. The first organic layer pattern, the second organic layer pattern, and the third organic layer pattern may emit the first color light, the second color light, and the third color light, respectively. The first organic layer pattern, the second organic layer pattern, and the third organic layer pattern may be formed by a pattern masking process. For example, the mask may include a fine metal mask, a shadow mask, etc.

The first sub-pixel 810 included in one unit pixel 805 and the first sub-pixel included in another unit pixel adjacent to the one unit pixel 805 may emit the same color, the second sub-pixel 820 included in the one unit pixel 805 and the second sub-pixel included in the other unit pixel may emit the same color, and the third sub-pixel 830 included in one unit pixel 805 and the third sub-pixel included in the other unit pixel may emit the same color. Accordingly, the first organic layer pattern through the third organic layer pattern may be formed at the same time using the same opening portion of the mask.

Figure 9:
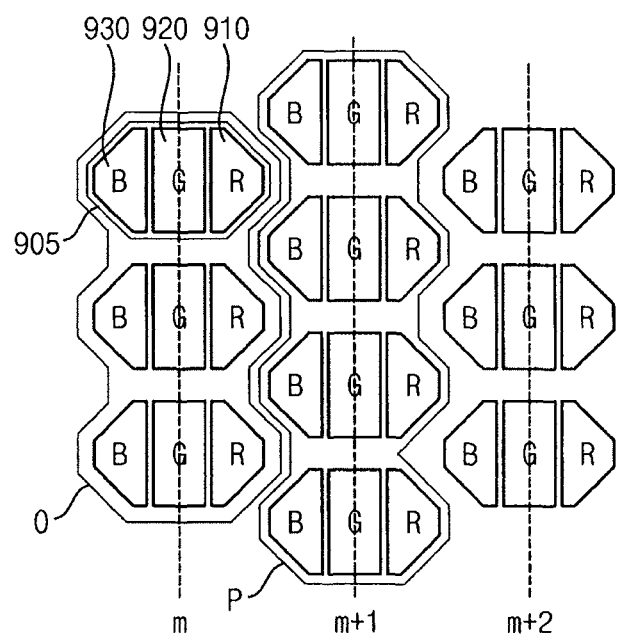
FIG. 9 illustrates a diagram of a display panel in accordance with example embodiments.

FIG. 9 illustrates a diagram of a display panel in accordance with example embodiments.

Since a display panel 900 of FIG. 9 has a structure substantially the same as or substantially similar to the display panel 300 of FIG. 3, except for arrangement of sub-pixels included in a unit pixel 905, duplicate descriptions will be omitted below. Referring to FIG. 9, the display panel 900 may include the plurality of unit pixels 905.

Each of the unit pixels 905 may include a first sub-pixel 910, a second sub-pixel 920, and a third sub-pixel 930. Each of the unit pixels 905 may have a horizontally long hexagonal shape. In some example embodiments, an area of the first sub-pixel 910 may be the same as an area of the third sub-pixel 930. Additionally, in some example embodiments, an area of the second sub-pixel 920 may be the same as the area of the first sub-pixel 910 or the third sub-pixel 930.

The first sub-pixel 910, the second sub-pixel 920, and the third sub-pixel 930 may be sequentially located in a row direction in each of the unit pixels 905. The first sub-pixel 910 and the third sub-pixel 930 may be symmetrically arranged with respect to the second sub-pixel 920. a first unit pixel a second unit pixel The first sub-pixel 910 may emit a first color light and may have a polygonal shape having the five or more sides (e.g., a hexagonal shape). The second sub-pixel 920 may emit a second color light and may have a rectangular shape. The third sub-pixel 930 may emit a third color light and may have a polygonal shape having the five or more sides (e.g., a hexagonal shape). In some example embodiments, the color of the first color light emitted by the first sub-pixel 910 may be one of a red color, a blue color and a green color, the color of the second color light emitted by the second sub-pixel 920 may be another one of the red color, the blue color and the green color, and the color of the third color light emitted by the third sub-pixel 930 may be the other one of the red color, the blue color and the green color.

In example embodiments, the first sub-pixel 910 included in one unit pixel 905 may emit light having a color the same as a color of light emitted by the first sub-pixel included in another unit pixel adjacent to the one unit pixel adjacent to the one unit pixel 905 along a column direction. Further, the second sub-pixel 920 included in the one unit pixel 905 may emit light having a color the same as a color of light emitted by the second sub-pixel included in the other unit pixel, and the third sub-pixel 930 included in the one unit pixel 905 may emit light having a color the same as a color of light emitted by the third sub-pixel included in the other unit pixel.

As illustrated in FIG. 9, the display panel 900 may include first unit pixels O located in a first column (e.g., a (m)th column) of the display panel 900, and second unit pixels P located in a second column (e.g., a (m+1)th column) of the display panel 900 adjacent to the first column. The third sub-pixels 930 included in the first unit pixels O may mesh with the first sub-pixels included in the second unit pixels P in a sawtooth shape. Additionally, one of the first unit pixels O may be adjacent to two of the second unit pixels P, and at least one side of the third sub-pixel 330 included in the one of the first unit pixels O may adjoin at least one side of the first sub-pixel included in each of the two of the second unit pixels P. Accordingly, a distance between adjacent unit pixels may be decreased, which results in the high resolution of the display panel 900.

In example embodiments, the third sub-pixel 930 included in one of the first unit pixels O and the first sub-pixel included in one of the second unit pixels P adjacent to the one of the first unit pixels O, when combined, may emit one of a fourth color light, a fifth color light and a sixth color light. For example, the third sub-pixel 930 included in the one of the first unit pixels O and the first sub-pixel included in the one of the second unit pixels P may emit light having one of a magenta color, a yellow color, and a cyan color.

The first sub-pixel 910, the second sub-pixel 920, and the third sub-pixel 930 may include a first organic layer pattern, a second organic layer pattern, and a third organic layer pattern, respectively. The first organic layer pattern, the second organic layer pattern, and the third organic layer pattern may emit a first color light, a second color light, and a third color light, respectively. The first organic layer pattern, the second organic layer pattern, and the third organic layer pattern may be formed by a pattern masking process. For example, the mask may include a fine metal mask, a shadow mask, etc.

The first sub-pixel 910 included in each unit pixel 905 and the first sub-pixel included in another unit pixel adjacent to the each unit pixel 905 may emit the same color. The second sub-pixel 920 included in the each unit pixel 905 and the second sub-pixel included in the other unit pixel may emit the same color. The third sub-pixel 930 included in each unit pixel 905 and the third sub-pixel included in the other unit pixel may emit the same color. Accordingly, the first organic layer pattern through the third organic layer pattern may be formed at the same time using the same opening portion of the mask.

Figure 10:
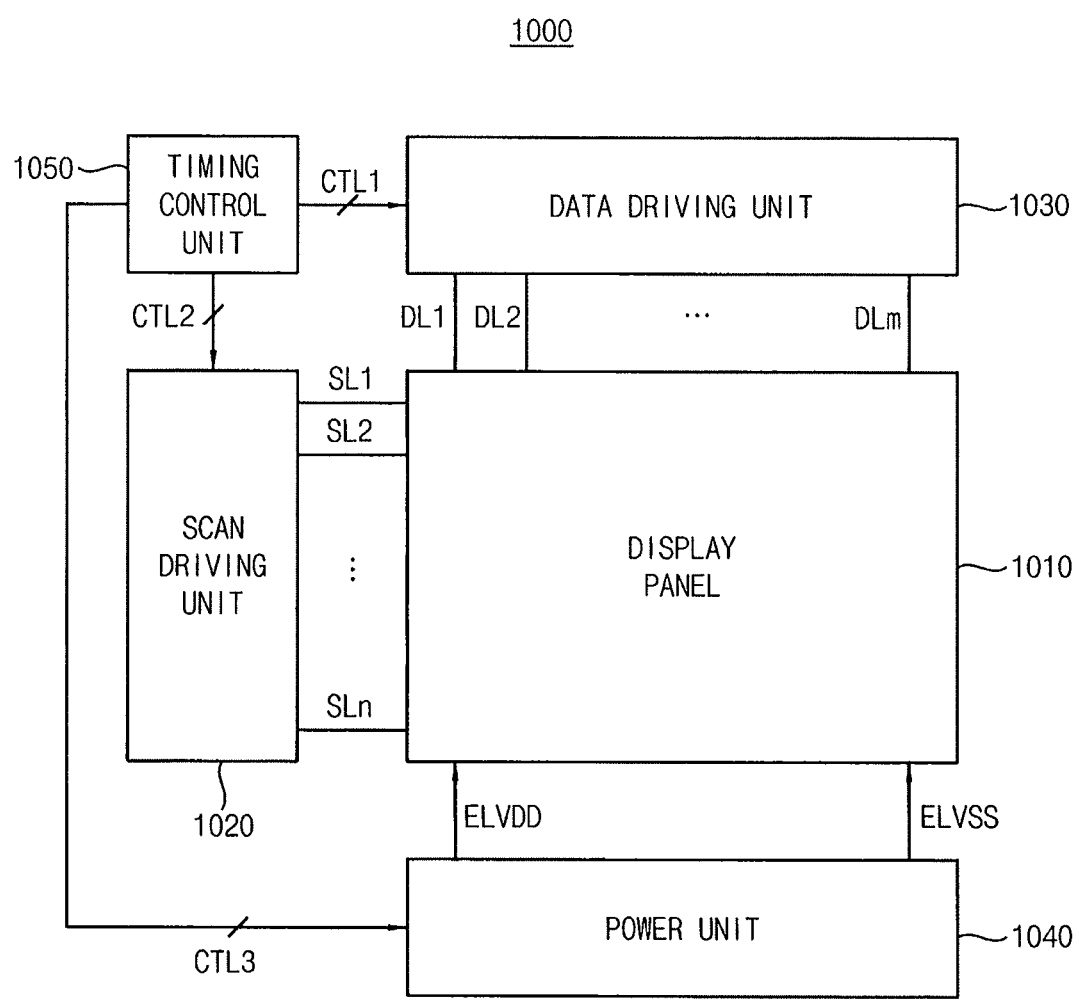
FIG. 10 illustrates a block diagram of a display device in accordance with example embodiments.

FIG. 10 illustrates a block diagram of a display device in accordance with example embodiments.

Referring to FIG. 10, a display device 1000 may include a display panel 1010, a scan driving unit 1020, a data driving unit 1030, a power unit 1040, and a timing control unit 1050. In some example embodiments, the display device 1000 may be an organic light emitting display (OLED) device. In other example embodiments, the display device 1000 may be a liquid crystal display (LCD) device, a plasma display panel (PDP), or the like.

The display panel 1010 may include a plurality of unit pixels. The scan driving unit 1020 may provide a scan signal to the unit pixels through a plurality of scan-lines SL1, . . . , SLn. The data driving unit 1030 may provide a data signal to the unit pixels through a plurality of data-lines DL1, . . . , DLn. The power unit 1040 may generate a high-power voltage ELVDD and a low-power voltage ELVSS, and may provide the high-power voltage ELVDD and the low-power voltage ELVSS to the unit pixels through a plurality of power-lines. The timing control unit 1050 may control the scan driving unit 1020, the data driving unit 1030, and the power unit 1040. The timing control unit 1050 may generate a plurality of control signals CTL1, CTL2, CTL3, and may provide the control signals CTL1, CTL2, CTL3 to the scan driving unit 1020, the data driving unit 1030, and the power unit 1040, respectively.

Although it is illustrated in FIG. 10 that the scan driving unit 1020, the data driving unit 1030, the power unit 1040, and the timing control unit 1050 are separately implemented, the scan driving unit 1020, the data driving unit 1030, the power unit 1040, and the timing control unit 1050 may be combined. Thus, the scan driving unit 1020, the data driving unit 1030, the power unit 1040, and the timing control unit 1050 may be interpreted as functions of at least one peripheral circuit coupled to the display panel 1010. For example, the timing control unit 1050 may perform operations of the scan driving unit 1020, the data driving unit 1030, the power unit 1040, or may include at least one component for performing operations of the scan driving unit 1020, the data driving unit 1030, the power unit 1040.

Each unit pixel included in a display panel 1010 according to example embodiments may include a first sub-pixel emitting a first color light and having a polygonal shape having five or more sides (e.g., a pentagonal shape and/or a hexagonal shape), a second sub-pixel emitting a second color light and having a rectangular shape, and a third sub-pixel emitting a third color light and having the polygonal shape having the five or more sides (e.g., the pentagonal shape and/or the hexagonal shape). The first sub-pixel and the third sub-pixel may be symmetrically arranged with respect to the second sub-pixel. Accordingly, each unit pixel may have a polygonal shape having six or more sides (e.g., a hexagonal shape and/or an octagonal shape). As a result, a distance between adjacent unit pixels may be decreased, which results in the high resolution of the display panel 1010. Additionally, a sub-pixel included in a unit pixel emitting one of the first, second and third color light and an adjacent sub-pixel included in an adjacent unit pixel emitting another one of the first, second and third color light may be interactively driven to emit one of a fourth color light, a fifth color light and a sixth color light. Accordingly, the display panel 1010 according to example embodiments may improve color reproduction performance, and thus may display high-quality images.

Furthermore, in some example embodiments, the sub-pixels are sequentially arranged in one direction of a column direction and a row direction in one unit pixel, and arrangement of the sub-pixels included in the one unit pixel may be different from arrangement of the sub-pixels included in another unit pixel adjacent to the one unit pixel along the other direction of the column direction and the row direction. Thus, while the sub-pixels are sequentially arranged in the one direction of the column direction and the row direction in each unit pixel, an additional unit pixel may be further formed along the other direction of the column direction and the row direction. Accordingly, in the display panel according to example embodiments, each unit pixel where the sub-pixels are sequentially arranged in the one direction of the column direction and the row direction may be used, or alternatively each unit pixel where the sub-pixels are sequentially arranged in the other direction of the column direction and the row direction may be used. Therefore, the display panel 1010 according to example embodiments may have improved display ability, and may provide high-quality images.

The display device 1000 may include the display panel 1010, thereby providing high-quality images without increasing a size of the display panel 1010.

Figure 11:
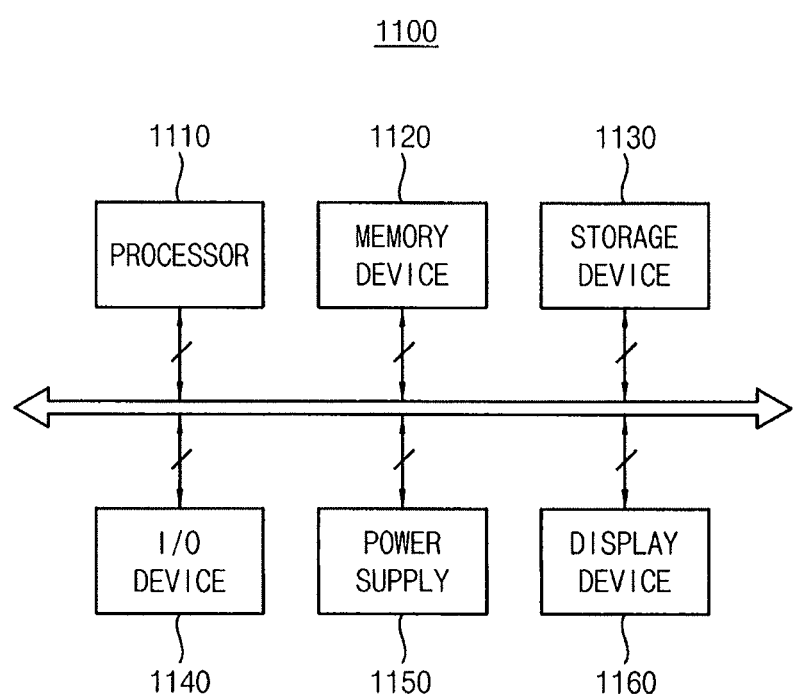
FIG. 11 illustrates a block diagram of an electronic device including the display device of FIG. 10 in accordance with example embodiments.

FIG. 11 illustrates a block diagram of an electronic device including a display device of FIG. 10 in accordance with example embodiments.

Referring to FIG. 11, the electronic device 1100 may include a processor 1110, a memory device 1120, a storage device 1130, an input/output (I/O) device 1140, a power supply 1150, and a display device 1160. In some example embodiments, the display device 1160 may be an organic light emitting display (OLED) device. In other example embodiments, the display device 1160 may be a liquid crystal display (LCD) device, a plasma display panel (PDP), or the like. The display device 1160 may correspond to the display device 1000 of FIG. 10. In addition, the electronic device 1100 may further include a plurality of ports for communicating a video card, a sound card, a memory card, a universal serial bus (USB) device, other electronic devices, etc.

The processor 1110 may perform various computing functions. The processor 1110 may be a micro-processor, a central processing unit (CPU), etc. The processor 1110 may be coupled to other components via an address bus, a control bus, a data bus, etc. In some example embodiments, the processor 1110 may be coupled to an extended bus such as a peripheral component interconnection (PCI) bus. The memory device 1120 may store data for operations of the electronic device 1100. For example, the memory device 1120 may include a volatile semiconductor memory device such as a dynamic random access memory (DRAM) device, a static random access memory (SRAM) device, a mobile DRAM device, etc, and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some example embodiments, the storage device 1130 may correspond to an SSD device, an HDD device, a CD-ROM device, etc. The storage device 1130 may include a solid state drive (SSD), a hard disk drive (HDD), a CD-ROM, etc.

The I/O device 1140 may include an input device such as a keyboard, a keypad, a touch-pad, a touch-screen, a mouse, etc, and an output device such as a speaker, a printer, etc. In some example embodiments, the organic light emitting display device 1160 may be included in the I/O device 1140. The power supply 1150 may provide a power for operations of the electronic device 1100. The organic light emitting display device 1160 may be coupled to other components via the buses or other communication links.

As described above, the display device 1160 may include a display panel, a scan driving unit, a data driving unit, a power unit, and a timing control unit. The display panel may include a plurality of unit pixels, and each unit pixel included in the display panel according to example embodiments may include a first sub-pixel emitting a first color light and having a polygonal shape having five or more sides (e.g., a pentagonal shape and/or a hexagonal shape), a second sub-pixel emitting a second color light and having a rectangular shape, and a third sub-pixel emitting a third color light and having a polygonal shape having the five or more sides (e.g., a pentagonal shape and/or a hexagonal shape). The first sub-pixel and the third sub-pixel may be symmetrically arranged with respect to the second sub-pixel. Accordingly, each unit pixel may have a polygonal shape having six or more sides (e.g., a hexagonal shape and/or an octagonal shape). As a result, a distance between adjacent unit pixels may be decreased, which results in the high resolution of the display panel. Additionally, a sub-pixel included in a unit pixel emitting one of the first, second and third color light and an adjacent sub-pixel included in an adjacent unit pixel emitting another one of the first, second and third color light may be interactively driven to emit one of a fourth color light, a fifth color light and a sixth color light. Accordingly, the display panel according to example embodiments may improve color reproduction performance, and thus may display high-quality images.

Furthermore, in some example embodiments, the sub-pixels are sequentially arranged in one direction of a column direction and a row direction in one unit pixel, and arrangement of the sub-pixels included in the one unit pixel may be different from arrangement of the sub-pixels included in another unit pixel adjacent to the one unit pixel along the other direction of the column direction and the row direction. Thus, while the sub-pixels are sequentially arranged in the one direction of the column direction and the row direction in each unit pixel, an additional unit pixel may be further formed along the other direction of the column direction and the row direction. Accordingly, in the display panel according to example embodiments, each unit pixel where the sub-pixels are sequentially arranged in the one direction of the column direction and the row direction may be used, or alternatively each unit pixel where the sub-pixels are sequentially arranged in the other direction of the column direction and the row direction may be used. Therefore, the display panel according to example embodiments may have improved display ability, and may provide high-quality images.

The present embodiments may be applied to a display device and an electronic device having the display device. For example, the present embodiments may be applied to a television, a digital television, a mobile phone, a smart phone, a laptop computer, a tablet computer, a personal digital assistants (PDA), a portable multimedia player (PMP), a digital camera, a music player, a portable game console, a navigation device, etc.

By way of summary and review, as described above, each unit pixel included in a display panel according to example embodiments may include a first sub-pixel emitting a first color light and having a polygonal shape having five or more sides (e.g., a pentagonal shape and/or a hexagonal shape), a second sub-pixel emitting a second color light and having a rectangular shape, and a third sub-pixel emitting a third color light and having a polygonal shape having the five or more sides (e.g., a pentagonal shape and/or a hexagonal shape). The first sub-pixel and the third sub-pixel may be symmetrically arranged with respect to the second sub-pixel. Accordingly, each unit pixel may have a polygonal shape having six or more sides (e.g., a hexagonal shape and/or an octagonal shape). As a result, a distance between adjacent unit pixels may be decreased, which results in the high resolution of the display panel. Additionally, a sub-pixel included in a unit pixel emitting one of the first, second and third color light and an adjacent sub-pixel included in an adjacent unit pixel emitting another one of the first, second and third color light may be interactively driven to emit one of a fourth color light, a fifth color light and a sixth color light. Accordingly, the display panel according to example embodiments may improve color reproduction performance, and thus may display high-quality images.

Furthermore, in some example embodiments, the sub-pixels are sequentially arranged in one direction of a column direction and a row direction in one unit pixel, and arrangement of the sub-pixels included in the one unit pixel may be different from arrangement of the sub-pixels included in another unit pixel adjacent to the one unit pixel along the other direction of the column direction and the row direction. Thus, while the sub-pixels are sequentially arranged in the one direction of the column direction and the row direction in each unit pixel, an additional unit pixel may be further formed along the other direction of the column direction and the row direction.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display panel including a plurality of unit pixels, each of the plurality of unit pixels comprising:
   a first sub-pixel having a polygonal shape having five or more sides;
   a second sub-pixel having a rectangular shape; and
   a third sub-pixel having a polygonal shape having five or more sides, the first, second, and third sub-pixels emitting light having different colors from each other, and the first sub-pixel and the third sub-pixel being symmetrically arranged with respect to the second sub-pixel,
   wherein the third sub-pixel included in a first unit pixel of the plurality of unit pixels emits light having one of a red color, a green color, and a blue color,
   wherein the first sub-pixel included in a second unit pixel of the plurality of unit pixels emits light having another one of the red color, the green color, and the blue color, the first and second unit pixels being arranged to have the third sub-pixel of the first unit pixel adjacent to the first sub-pixel of the second unit pixel, and
   wherein the third sub-pixel included in the first unit pixel and the first sub-pixel included in the second unit pixel, when combined, emit light having one of a magenta color, a yellow color, and a cyan color.

2. The display panel as claimed in claim 1, wherein each of the first sub-pixel and the third sub-pixel has a pentagonal shape, and each of the plurality of unit pixels has a hexagonal shape.

3. The display panel as claimed in claim 1, wherein each of the first sub-pixel and the third sub-pixel has a hexagonal shape, and each of the plurality of unit pixels has an octagonal shape.

4. The display panel as claimed in claim 1, wherein the first sub-pixel, the second sub-pixel, and the third sub-pixel are sequentially arranged in a column direction extending along the first direction.

5. The display panel as claimed in claim 4, wherein:
   the first sub-pixel included in a first unit pixel of the plurality of unit pixels emits light having a color different from a color of light emitted by a first sub-pixel included in a second unit pixel of the plurality of unit pixels adjacent to the first unit pixel along a row direction,
   the second sub-pixel included in the first unit pixel emits light having a color different from a color of light emitted by a second sub-pixel included in the second unit pixel, and
   the third sub-pixel included in the first unit pixel emits light having a color different from a color of light emitted by a third sub-pixel included in the second unit pixel.

6. The display panel as claimed in claim 4, wherein:
   the plurality of unit pixels includes first unit pixels in a first row of the display panel, and second unit pixels in a second row of the display panel adjacent to the first row, and
   the third sub-pixels included in the first unit pixels mesh with the first sub-pixels included in the second unit pixels in a sawtooth shape.

7. The display panel as claimed in claim 6, wherein one of the first unit pixels is adjacent to two of the second unit pixels, at least one side of the third sub-pixel included in the one of the first unit pixels adjoins at least one side of the first sub-pixel included in each of the two of the second unit pixels.

8. The display panel as claimed in claim 1, wherein the first sub-pixel, the second sub-pixel, and the third sub-pixel are sequentially located in a row direction extending along the first direction.

9. The display panel as claimed in claim 8, wherein:
   the first sub-pixel included in a first unit pixel of the plurality of unit pixels emits light having a color different from a color of light emitted by a first sub-pixel included in a second unit pixel of the plurality of unit pixels adjacent to the first unit pixel along a column direction,
   the second sub-pixel included in the first unit pixel emits light having a color different from a color of light emitted by a second sub-pixel included in the second unit pixel, and
   the third sub-pixel included in the first unit pixel emits light having a color different from a color of light emitted by a third sub-pixel included in the second unit pixel.

10. The display panel as claimed in claim 8, wherein:
    the plurality of unit pixels includes first unit pixels located in a first column of the display panel, and second unit pixels located in a second column of the display panel adjacent to the first column, and the third sub-pixels included in the first unit pixels mesh with the first sub-pixels included in the second unit pixels in a sawtooth shape.

11. The display panel as claimed in claim 10, wherein one of the first unit pixels is adjacent to two of the second unit pixels, at least one side of the third sub-pixel included in the one of the first unit pixels adjoins at least one side of the first sub-pixel included in each of the two of the second unit pixels.

12. The display panel as claimed in claim 1, wherein an area of the first sub-pixel is the same as an area of the third sub-pixel.

13. The display panel as claimed in claim 12, wherein an area of the second sub-pixel is the same as the area of the first sub-pixel or the third sub-pixel.

14. A display device, comprising:
a display panel including a plurality of unit pixels;
a scan driving unit to provide a scan signal to the display panel;
a data driving unit to provide a data signal to the display panel; and
a timing control unit to control the scan driving unit and the data driving unit,
wherein each of the plurality of unit pixels includes:
a first sub-pixel having a polygonal shape having five or more sides,
a second sub-pixel having a rectangular shape, and
a third sub-pixel having a polygonal shape having five or more sides, the first, second, and third sub-pixels emitting light having different colors from each other, and the first sub-pixel and the third sub-pixel being symmetrically arranged with respect to the second sub-pixel,
wherein the third sub-pixel included in a first unit pixel of the plurality of unit pixels emits light having one of a red color, a green color, and a blue color,
wherein the first sub-pixel included in a second unit pixel of the plurality of unit pixels emits light having another one of the red color, the green color, and the blue color, the first and second unit pixels being arranged to have the third sub-pixel of the first unit pixel adjacent to the first sub-pixel of the second unit pixel, and
wherein the third sub-pixel included in the first unit pixel and the first sub-pixel included in the second unit pixel, when combined, emit light having one of a magenta color, a yellow color, and a cyan color.

15. The display device as claimed in claim 14, wherein each of the first sub-pixel and the third sub-pixel has a pentagonal shape, and each of the plurality of unit pixels has a hexagonal shape.

16. The display device as claimed in claim 14, wherein each of the first sub-pixel and the third sub-pixel has a hexagonal shape, and each of the plurality of unit pixels has an octagonal shape.

* * * * *